(12) United States Patent
Chu et al.

(10) Patent No.: US 11,169,317 B2
(45) Date of Patent: Nov. 9, 2021

(54) REFLECTOR PLATE AND MANUFACTURING METHOD THEREOF, BACKLIGHT MODULE AND MANUFACTURING METHOD THEREOF, DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Hanqi Chu, Beijing (CN); Yinan Wang, Beijing (CN); Dengling Xie, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 20 days.

(21) Appl. No.: 16/658,732

(22) Filed: Oct. 21, 2019

(65) Prior Publication Data
US 2020/0132915 A1  Apr. 30, 2020

(30) Foreign Application Priority Data
Oct. 26, 2018  (CN) .......................... 201811257545.5

(51) Int. Cl.
*F21V 8/00*  (2006.01)
(52) U.S. Cl.
CPC .................. *G02B 6/0055* (2013.01)

(58) Field of Classification Search
CPC ................................................... G02B 6/0055
See application file for complete search history.

(56) References Cited

U.S. PATENT DOCUMENTS

| | | | | |
|---|---|---|---|---|
| 5,492,741 | A * | 2/1996 | Akao ....................... | B32B 5/18 |
| | | | | 428/35.2 |
| 6,261,995 | B1 * | 7/2001 | Nakajima ........... | B41M 5/38257 |
| | | | | 428/32.51 |
| 6,535,337 | B1 * | 3/2003 | Tanaka ................. | G02B 5/0278 |
| | | | | 359/599 |
| 7,019,887 | B1 * | 3/2006 | Guo .................... | G02B 26/0841 |
| | | | | 359/224.1 |
| 2004/0033675 | A1 * | 2/2004 | Fleming ............ | B32B 17/10871 |
| | | | | 438/482 |
| 2004/0209007 | A1 * | 10/2004 | Satake .................. | H01G 11/48 |
| | | | | 428/1.3 |
| 2004/0229059 | A1 * | 11/2004 | Kausch ................. | B32B 27/08 |
| | | | | 428/480 |
| 2007/0224415 | A1 * | 9/2007 | Satake .................... | G02B 1/16 |
| | | | | 428/341 |
| 2009/0162617 | A1 * | 6/2009 | Moroishi .......... | G02F 1/133606 |
| | | | | 428/172 |

(Continued)

*Primary Examiner* — Tsion Tumebo
(74) *Attorney, Agent, or Firm* — Nath, Goldberg & Meyer; Joshua B. Goldberg

(57) ABSTRACT

A reflector plate and a manufacturing method thereof, a backlight module and a manufacturing method thereof, and a display device are provided. The reflector plate includes a metal reflective layer and an electrostatic adsorption prevention layer disposed on a side of the metal reflective layer. The electrostatic adsorption prevention layer is made of a polyester material and carries negative electrostatic charges.

14 Claims, 3 Drawing Sheets

(56) References Cited

U.S. PATENT DOCUMENTS

| | | | | |
|---|---|---|---|---|
| 2011/0075397 | A1* | 3/2011 | Hsu | G02B 6/0065 |
| | | | | 362/97.1 |
| 2012/0019743 | A1* | 1/2012 | Chen | G02B 6/0065 |
| | | | | 349/65 |
| 2012/0106195 | A1* | 5/2012 | Chen | G02B 6/0076 |
| | | | | 362/607 |
| 2015/0023054 | A1* | 1/2015 | Goda | G02B 6/0055 |
| | | | | 362/607 |
| 2015/0210045 | A1* | 7/2015 | Koike | B32B 27/08 |
| | | | | 428/41.8 |
| 2015/0378086 | A1* | 12/2015 | Feng | G02B 6/0051 |
| | | | | 349/64 |
| 2016/0193814 | A1* | 7/2016 | Koike | B32B 27/06 |
| | | | | 428/215 |
| 2016/0370536 | A1* | 12/2016 | Tan | H02N 1/04 |
| 2017/0090674 | A1* | 3/2017 | Meng | G06F 3/0414 |
| 2017/0307809 | A1* | 10/2017 | Gao | G02B 6/0083 |
| 2018/0011353 | A1* | 1/2018 | Wang | G02F 1/133308 |
| 2019/0094611 | A1* | 3/2019 | You | G02F 1/1343 |
| 2019/0113664 | A1* | 4/2019 | Yoshikawa | G02B 5/3041 |
| 2019/0162893 | A1* | 5/2019 | Asatani | G02B 6/0051 |
| 2019/0235289 | A1* | 8/2019 | Asatani | G02F 1/133615 |
| 2019/0265549 | A1* | 8/2019 | Chen | G02F 1/133603 |
| 2019/0344535 | A1* | 11/2019 | Sugamata | B32B 7/02 |
| 2019/0373715 | A1* | 12/2019 | Liu | G02B 6/0083 |

* cited by examiner

REFLECTOR PLATE AND MANUFACTURING METHOD THEREOF, BACKLIGHT MODULE AND MANUFACTURING METHOD THEREOF, DISPLAY DEVICE

CROSS-REFERENCE TO RELATED APPLICATIONS

The present application claims the priority of Chinese Patent Application No. 201811257545.5, filed on Oct. 26, 2018, in the Chinese intellectual Property Office, the disclosure of which is incorporated herein in its entirety by reference.

TECHNICAL FIELD

The disclosure relates to the field of display technology, and in particular, to a reflector plate and a manufacturing method thereof, a backlight module and a manufacturing method thereof, and a display device.

BACKGROUND

Flat panel display devices are mainly implemented with liquid crystal. In a liquid crystal display panel, liquid crystal itself does not emit light, and a backlight module is employed to provide a light source with uniformity and high brightness. The backlight module converts a commonly used point or line light source into a surface light source with high brightness and uniform brilliance, thereby enabling the liquid crystal display panel to display images normally.

The backlight module includes components such as a light source, a reflector plate, a light guide plate (LGP for short), and an optical layer, etc. The reflector plate serves to improve the utilization of light and increase the brightness of the light. The light guide plate guides the direction of the light emitted from the light source to make emergent light rays uniform.

SUMMARY

According to an embodiment of the present disclosure, there is provided a reflector plate including a metal reflective layer and an electrostatic adsorption prevention layer disposed on a side of the metal reflective layer. The electrostatic adsorption prevention layer is made of a polyester material and carries negative electrostatic charges.

According to an embodiment of the present disclosure, the electrostatic adsorption prevention layer has a thickness ranging from 75 μm to 150 μm.

According to an embodiment of the present disclosure, the electrostatic adsorption prevention layer has a thickness ranging from 75 μm to 125 μm.

According to an embodiment of the present disclosure, the reflector plate further includes a substrate and an adhesion layer. The adhesion layer is disposed on the substrate, and the metal reflective layer is disposed on a side of the adhesion layer distal to the substrate.

According to an embodiment of the present disclosure, the metal reflective layer is made of silver.

According to an embodiment of the present disclosure, there is provided a backlight module including the reflector plate described above. The backlight module includes an optical component disposed on a side, distal to the metal reflective layer, of the electrostatic adsorption prevention layer of the reflector plate. The optical component includes a light guide plate and an optical layer, the light guide plate is disposed on the electrostatic adsorption prevention layer, and the optical layer is disposed on a side of the light guide plate distal to the electrostatic adsorption prevention layer.

According to an embodiment of the present disclosure, the light guide plate is made of a polyester material.

According to an embodiment of the present disclosure, the electrostatic adsorption prevention layer and the light guide plate are both made of a polycarbonate material.

According to an embodiment of the present disclosure, there is provided a display device including a display panel. The display device further includes the backlight module described above.

According to an embodiment of the present disclosure, the light guide plate is made of a polyester material.

According to an embodiment of the present disclosure, the electrostatic adsorption prevention layer and the light guide plate are both made of a polycarbonate material.

According to an embodiment of the present disclosure, there is provided a manufacturing method for a reflector plate described above. The manufacturing method includes: forming an adhesion layer on a substrate; forming a metal reflective layer on the adhesion layer; depositing or spraying a polyester material on the metal reflective layer to form an electrostatic adsorption prevention layer; forming a protective layer on the electrostatic adsorption prevention layer; and stripping off the protective layer from the electrostatic adsorption prevention layer such that the electrostatic adsorption prevention layer carries negative electrostatic charges.

According to an embodiment of the present disclosure, the depositing or spraying a polyester material on the metal reflective layer to form the electrostatic adsorption prevention layer includes: depositing or spraying a polycarbonate material on the metal reflective layer to form the electrostatic adsorption prevention layer; the forming the protective layer on the electrostatic adsorption prevention layer includes: depositing or spraying a polyethylene material on the electrostatic adsorption prevention layer to form the protective layer.

According to an embodiment of the present disclosure, the depositing or spraying a polyester material on the metal reflective layer to form the electrostatic adsorption prevention layer includes: depositing or spraying a polycarbonate material on the metal reflective layer to form the electrostatic adsorption prevention layer; the forming the protective layer on the electrostatic adsorption prevention layer includes: depositing or spraying a polyurethane material on the electrostatic adsorption prevention layer to form the protective layer.

According to an embodiment of the present disclosure, the depositing or spraying a polyester material on the metal reflective layer to form the electrostatic adsorption prevention layer includes: depositing or spraying a polycarbonate material on the metal reflective layer to form the electrostatic adsorption prevention layer; the forming the protective layer on the electrostatic adsorption prevention layer includes: depositing or spraying an acrylic material on the electrostatic adsorption prevention layer to form the protective layer.

According to an embodiment of the present disclosure, there is provided a manufacturing method for a backlight module. The backlight module includes a reflector plate and an optical component. The optical component includes a light guide plate and an optical layer, and the light guide plate is disposed on the reflector plate. The manufacturing method for the backlight module includes: forming an adhesion layer on a substrate; forming a metal reflective layer on the adhesion layer; depositing or spraying a polyester material on the metal reflective layer to form an electrostatic adsorption prevention layer; forming a protective layer on the electrostatic adsorption prevention layer; stripping off the protective layer from the electrostatic adsorption prevention layer such that the electrostatic adsorption prevention layer carries negative electrostatic charges; placing the light guide plate on the electrostatic adsorption prevention layer of the reflector plate from which the protective layer is stripped off; placing the optical layer on a side of the light guide plate distal to the electrostatic adsorption prevention layer.

DETAILED DESCRIPTION

In order to enable those skilled in the art to better understand the solution of the present disclosure, a reflector plate and a manufacturing method thereof, a backlight module and a manufacturing method thereof, and a display device of the present disclosure are further described in detail below with reference to the accompanying drawings and specific embodiments.

The inventors have found that there is a poor picture such as with a water stain in a liquid crystal display device, which affects the display effect. The reason for such phenomenon lies in a reflector plate in a backlight module. At present, the reflector plate is usually made of a silver material. Since a surface of the reflector plate is of low roughness, an air band tends to be formed between the reflector plate made of the silver material and a light guide plate in the backlight module. Meanwhile, there is electrostatic adsorption between the reflector plate and the light guide plate, and such partial adsorption may cause uneven spacing between the reflector plate and the light guide plate, which leads to the poor picture such as with the water stain.

In view of the problem of the poor picture due to the electrostatic adsorption between the reflector plate and the light guide plate, a reflector plate is provided in an embodiment. An electrostatic adsorption prevention layer is provided on the reflector plate to repel electrostatic charges on the light guide plate in the subsequent usage scenario, and thus electrostatic adsorption between the reflector plate and the light guide plate is reduced or eliminated.

The reflector plate includes a metal reflective layer and an electrostatic adsorption prevention layer provided on a side of the metal reflective layer. The electrostatic adsorption prevention layer is made of a polyester material and carries negative electrostatic charges. The electrostatic adsorption prevention layer serves to avoid an adsorption effect caused by the electrostatic charges, which is generated by the reflector plate, with an electrical property opposite to that of an optical component which is in contact with the reflector plate.

Figure 1:
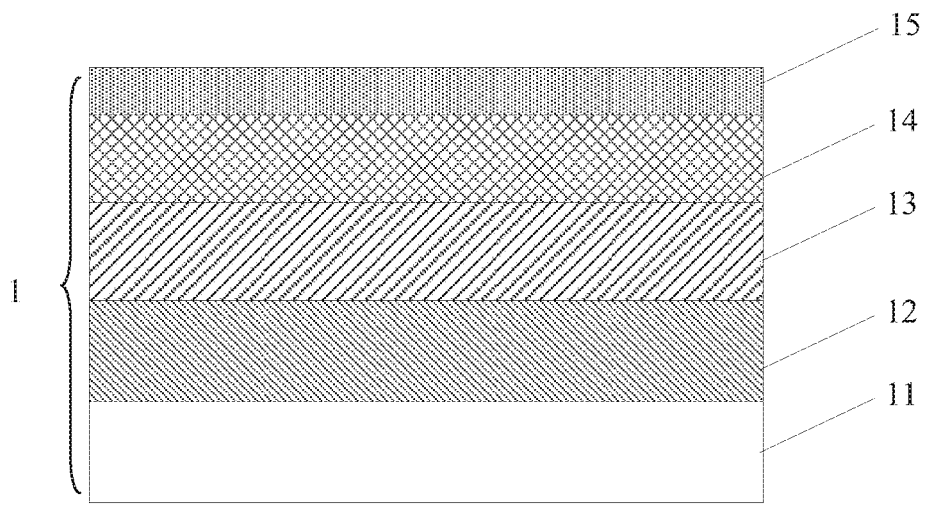
FIG. 1 is a schematic diagram of a structure of a reflector plate according to an embodiment of the present disclosure.

As shown in FIG. 1, the reflector plate 1 includes a substrate 11, an adhesion layer 12, a metal reflection layer 13, and an electrostatic adsorption prevention layer 14. The adhesion layer 12 is disposed on one side of the substrate 11. The metal reflective layer 13 is disposed on a side of the adhesion layer 12 distal to the substrate 11. The electrostatic adsorption prevention layer 14 is disposed on a side of the metal reflective layer 13 distal to the substrate 11. The adhesion layer 12 serves to make the metal reflective layer 13 adhere to the substrate 11, and is usually made of an adhesive material such as glue. In some embodiments, the metal reflective layer 13 may be disposed on the substrate 11, without the adhesion layer 12 provided between the metal reflective layer 13 and the substrate 11.

Generally, difference between two materials that are close to or rub each other decides what type of electrostatic charges will be generated. A type of material rubbing against any other different type of material may generate positive charges or negative charges. In the reflector plate 1, the metal reflection layer 13 includes a silver material (Ag). The reflector plate is usually used in combination with an optical component, and the electrostatic adsorption prevention layer 14 is used to generate electrostatic charges with the same type as that carried by the optical component adjacent to the reflector plate, thereby ensuring light to be better reflected by the metal reflective layer 13.

In some embodiments, in order to enable the reflector plate 1 to carry negative electrostatic charges, a protective layer 15 may be first disposed on the electrostatic adsorption prevention layer 14 made of the polyester material. The protective layer 15 is disposed on a side of the electrostatic adsorption prevention layer 14 distal to the substrate 11. The protective layer 15 is then stripped from the reflector plate 1. Thus, electrostatic charges occur on the protective layer 15 and the electrostatic adsorption prevention layer 14 by stripping. By selecting materials of the protective layer 15 and the electrostatic adsorption prevention layer 14, the electrostatic adsorption prevention layer 14 may early the same type of electrostatic charges as that of the optical component after the protective layer 15 is stripped off. Thus, the reflector plate repels the optical component in contact with or disposed opposite to the optical component, from the beginning that the reflector plate is used, thereby reducing or eliminating the adsorption effect caused by electrostatic charges with a type opposite to that of the optical component in contact with the reflector plate.

In some embodiments, the protective layer 15 is made of a polyester material to provide good protection to the electrostatic adsorption prevention layer 14. The protective layer 15 is stripped off before the reflector plate is used, and electrostatic charges (e.g., negative charges) may be generated during the stripping process. In one specific example, the protective layer 15 is made of a polyethylene material and the electrostatic adsorption prevention layer 14 is made of a polycarbonate material. Illustratively, the protective layer 15 may also be a PU (Polyurethane) film, or may be made of an acrylic material or the like.

The electrostatic adsorption prevention layer 14 on the surface of the reflector plate 1 may be formed by a spraying or vapor deposition process, which is mature, has a high process yield, and is simple, convenient and easy to implement.

In some embodiments, the substrate 11 is made of a resin material to provide a good support for the adhesion layer 12, the metal reflective layer 13, and the electrostatic adsorption prevention layer 14.

In some embodiments, the electrostatic adsorption prevention layer 14 is a polycarbonate material layer, with a thickness ranging from 75 μm to 150 μm. Performance tests such as brightness, LGP scratch, reliability, and absorption and an experimental test such as ball drop are performed on samples of the electrostatic adsorption prevention layer 14 with different thicknesses, and indicate that the thickness of the electrostatic adsorption prevention layer 14 ranges from 75 μm to 125 μm, and further, the thickness of the electrostatic adsorption prevention layer 14 μm is 75 μm. In the case of a thickness of 75 μm, the brightness loss is small, each performance of the ball drop, the reliability and the adsorption and the like is superior, and the brightness gain is basically not lost. As for the specific test result, please refer to Table 1, which shows performance test results of reflector plates provided with electrostatic adsorption prevention layers with different thicknesses according to an embodiment of the present disclosure.

The reflector plate of the present disclosure is used to improve the luminous efficiency of a backlight module, and the reflector plate has an electrostatic adsorption prevention layer formed by an added polyester coating layer. The electrostatic charges (for example, negative charges) may be generated on the electrostatic adsorption prevention layer when the protective layer on the upper surface of the electrostatic adsorption prevention layer is removed by stripping before the electrostatic adsorption prevention layer is used, and the electrostatic charges have the same type as that of the electrostatic charges (i.e. also negative charges) on the surface of the optical component including a light guide plate used in connection with the reflector plate. The reflector plate having the electrostatic adsorption prevention layer repels the optical membrane including the light guide plate after they are assembled, and the mutual adsorption between their surfaces is reduced or eliminated.

Materials of the surfaces of the electrostatic adsorption prevention layer 14 and the optical component facing the reflector plate may generate electrostatic charges of a same type.

The optical component includes a light guide plate 4 and an optical layer 5, and the material of the surface of the electrostatic adsorption prevention layer 14 and the material of the surface of the light guide plate 4 facing the reflector plate 1 are both polyester such as polycarbonate. That is, the light guide plate 4 is positioned opposite to the reflector plate 1, and the side of the reflector plate 1 on which the electrostatic adsorption prevention layer 14 is provided faces the light guide plate 4.

Electrostatic charges may be generated both in the processes in which the backlight module 1 is respectively provided with the reflector plate 1 and the light guide plate 4, and the reflector plate 1 and the light guide plate 4 respectively generate the electrostatic charges. The electrostatic adsorption prevention layer 14 in the reflector plate 1 can generate the same type of electrostatic charges as the light guide plate 4, or is made of the same material as that of the light guide plate 4 such that there is no electrostatic charge generated in the rubbing between the reflector plate 1 and the light guide plate 4 after the reflector plate 1 and the light guide plate 4 are mounted.

Under a certain external force (such as friction, external electric field or electromagnetic field induction, etc.), electrons may leave the surface of one material and accumulate on the surface of another material, resulting in the fact that the total number of electrons is not equal to the total number of protons in the material. The material that loses electrons is positively charged, and the material that gets the electrons is negatively charged. When the resistance of the material is high, electrostatic charges are accumulated. In the process of contact, separation and friction, the charges are continuously generated and continuously leaked, and change of the amount of electrostatic charges is a dynamic equilibrium process. The electrostatic adsorption preventing layer 14 in the backlight module of the present embodiment is disposed

TABLE 1

| times | thickness of electrostatic adsorption prevention layer (μm) | LGP scratch | brightness | ball drop | reliability | absorption | remarks |
|---|---|---|---|---|---|---|---|
| 1 | 2 | NG | 100% | OK | OK | NG | |
| 2 | 3 | NG | 100% | OK | OK | NG | |
| 3 | 6 | NG | 100% | OK | OK | NG | |
| 4 | 10 | NG | 100% | OK | OK | NG | |
| 5 | 20 | NG | 100% | OK | OK | NG | |
| 6 | 30 | NG | 99.8% | OK | OK | NG | |
| 7 | 50 | OK | 99.8% | OK | OK | NG | |
| 8 | 75 | OK | 99.6% | OK | OK | OK | best |
| 9 | 100 | OK | 99.2% | OK | OK | OK | |
| 10 | 125 | OK | 98.8% | OK | OK | OK | |
| 11 | 150 | OK | 98.2% | NG | OK | OK | |
| 12 | 175 | OK | 97.3% | NG | OK | OK | |

According to an embodiment of the present disclosure, a backlight module is provided, and includes the reflector plate in the above embodiment, and thus a better backlight can be obtained.

Figure 2:
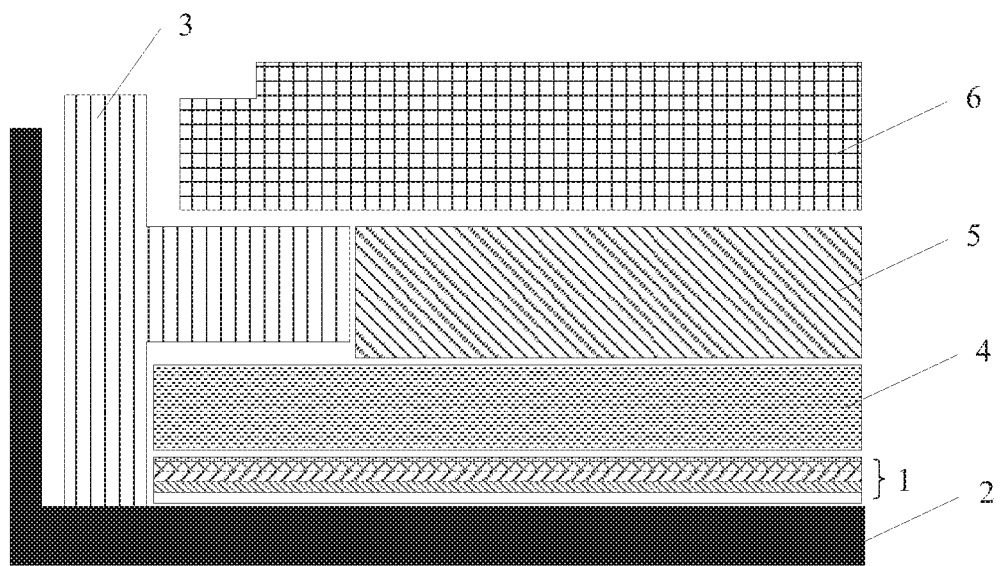
FIG. 2 is a schematic diagram of a structure of a display device according to an embodiment of the present disclosure.

As shown in FIG. 2, the backlight module includes a light source (not shown in FIG. 2), the reflector plate 1, and an optical component. The optical component is stacked on a side, distal to the metal reflection layer 13, of the electrostatic adsorption preventing layer 14 of the reflector plate 1.

on the reflector plate 1. By the protective layer 15 being first disposed on the electrostatic adsorption prevention layer 14 and then being stripped off, the electrostatic adsorption prevention layer 14 may generate the same type of electrostatic charges as the light guide plate 4 and repel the light guide plate 4. Therefore, electrostatic adsorption is reduced or eliminated in the backlight module of the present embodiment, thereby obtaining a better backlight.

For example, the light guide plate 4 carries negative electrostatic charges on its surface during the assembly process (for example, the electrostatic charges are generated on the surface of the light guide plate 4 after the protective layer on the surface of the light guide plate 4 is stripped off). A transparent polyester layer, as the electrostatic adsorption prevention layer 14, is sprayed on the surface of the metal reflective layer 13 of the reflector plate 1 and is caused to generate the same type of negative electrostatic charges as the light guide plate 4. A mutual repulsion between the reflector plate 1 and the light guide plate 4 is thus obtained to eliminate electrostatic adsorption by the transparent polyester layer with negative electrostatic charges.

An existing reflector plate in the prior art is adopted as a control sample for testing the reflector plate of the present disclosure, while the other related components in the backlight module are retained the same. From actual pictures obtained from the existing reflector plate in the prior art and the reflector plate of the present disclosure, it can be seen that, the actual picture obtained from the existing reflector plate in the prior art is a poor picture, the reason for which is the local electrostatic adsorption, and more fine scratches may be seen on the surface of the light guide plate 4; the actual picture obtained from the reflector plate 1 of the present disclosure is not a poor picture, less fine scratches may be seen on the surface of the light guide plate 4 and the picture is relatively clean. This indicates that the reflector plate 1 not only reduces the display defect such as the water stain phenomenon caused by the partial electrostatic adsorption, but also reduces the visibility of scratches on the surface of the light guide plate 14 during the manufacturing process.

It can be seen that, the backlight module can eliminate the electrostatic absorption between the surface of the reflector plate and the surface of the light guide plate, has good anti-adsorption effect, and has less brightness loss. Further, due to the presence of the electrostatic adsorption prevention layer, the shallow scratch on the lower surface of the light guide plate can be shielded, so that the white shading of the display screen is good. The reflector plate is applied to the backlight module to effectively ensure the display effect.

According to an embodiment of the present disclosure, there is provided a display device including the backlight module in the above embodiment. By adopting the above backlight module, the display device has no poor picture such as with the water stain, and the display effect is good.

Referring to FIG. 2, in the display device, the backlight module and the display panel 6 are supported and protected by a backplate 2 and a frame 3. The display device can be any product or component with display function such as a desktop computer, a tablet computer, a notebook computer, a mobile phone, a PDA, a GPS, a vehicle display, a projection display, a camera, a digital camera, an electronic watch, a calculator, an electronic instrument, a meter, a liquid crystal panel, an electronic paper, a television, a display, a digital photo frame, a navigator etc. and can be applied to various fields such as public display and virtual display.

Figure 3:
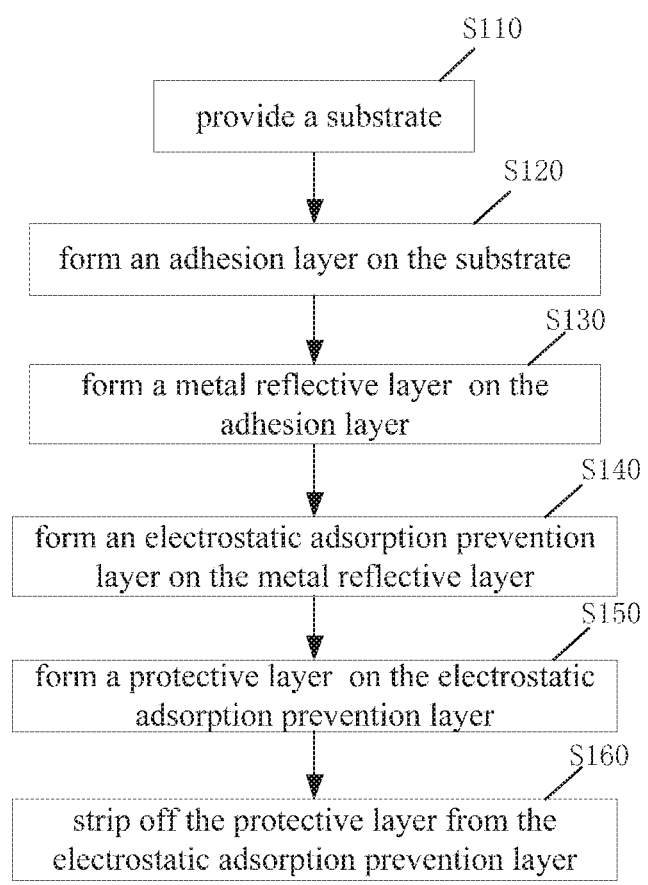
FIG. 3 is a flow chart of a manufacturing method for a reflector plate according to an embodiment of the present disclosure.

According to an embodiment of the present disclosure, a manufacturing method for a reflector plate is provided including the following steps, as shown in FIG. 3.

At step S110, a substrate is provided. The substrate may be made of a resin material for supporting a structure to be formed thereon.

At step S120, an adhesion layer is formed on the substrate. The adhesion layer may be made of an existing adhesive material for causing the structure to adhere to the substrate.

At step S130, a metal reflective layer is formed on the adhesion layer. In an embodiment, the metal reflective layer may be formed on the adhesion layer by a silver plating process. Alternatively, the metal reflective layer may be formed directly on the substrate, and the disclosure is not limited thereto.

At step S140, an electrostatic adsorption prevention layer is formed by depositing or spraying a polyester material on the metal reflective layer.

At step S150, a protective layer is formed on the electrostatic adsorption prevention layer.

At step S160, the protective layer is stripped off from the electrostatic adsorption prevention layer so that the electrostatic adsorption prevention layer carries negative electrostatic charges.

In some embodiments, the depositing or spraying a polyester material on the metal reflective layer to form the electrostatic adsorption prevention layer includes depositing or spraying a polycarbonate material on the metal reflective layer to form the electrostatic adsorption prevention layer; and the forming the protective layer on the electrostatic adsorption prevention layer includes depositing or spraying a polyethylene material on the electrostatic adsorption prevention layer to form the protective layer.

In some embodiments, the depositing or spraying a polyester material on the metal reflective layer to form the electrostatic adsorption prevention layer includes depositing or spraying a polycarbonate material on the metal reflective layer to form the electrostatic adsorption prevention layer; the forming the protective layer includes depositing or spraying a polyurethane material on the electrostatic adsorption prevention layer to form the protective layer.

In some embodiments, the depositing or spraying a polyester material on the metal reflective layer to form the electrostatic adsorption prevention layer includes depositing or spraying a polycarbonate material on the metal reflective layer to form the electrostatic adsorption prevention layer; and the forming the protective layer on the electrostatic adsorption prevention layer includes depositing or spraying an acrylic material on the electrostatic adsorption prevention layer to form the protective layer.

Figure 4:
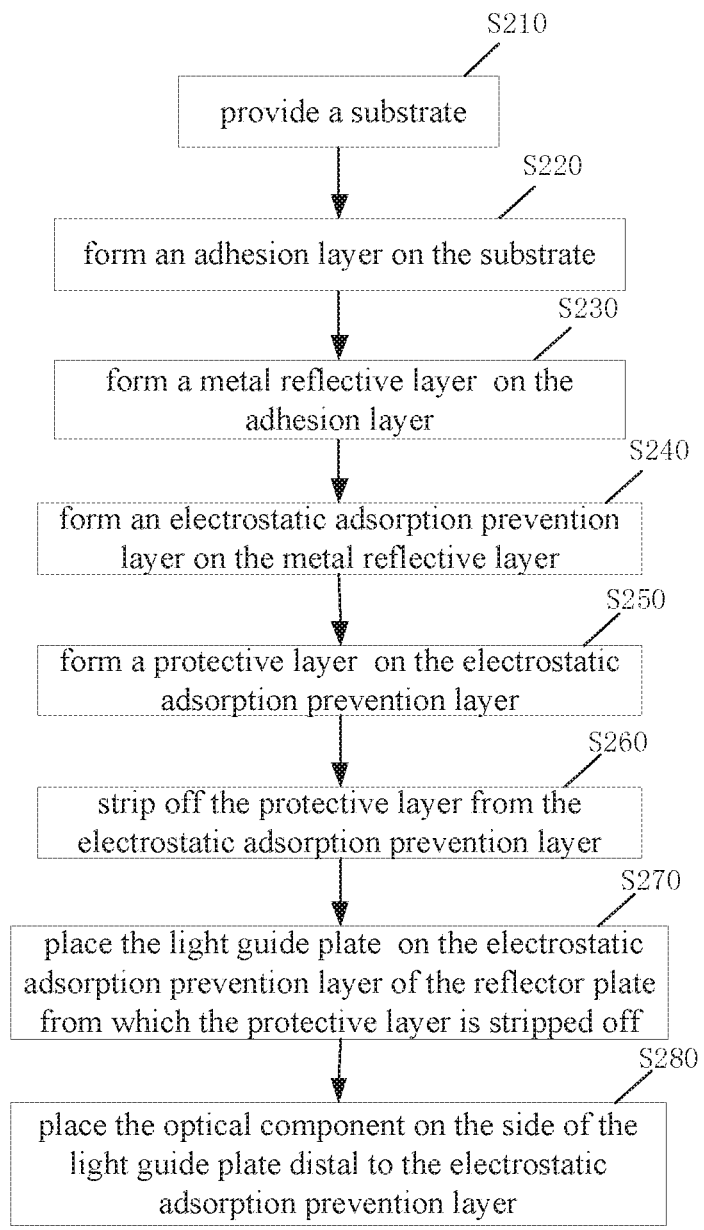
FIG. 4 is a flow chart of a manufacturing method for a backlight module according to an embodiment of the present disclosure.

According to an embodiment of the present disclosure, a manufacturing method for a backlight module is provided and the backlight module includes a reflector plate and an optical component. The optical component includes a light guide plate and an optical layer. The light guide plate is disposed on the reflector plate. As shown in FIG. 4, the manufacturing method for the backlight module includes the following steps.

At step S210, a substrate is provided. The substrate may be made of a resin material for supporting a structure to be formed thereon.

At step S220, an adhesion layer is formed on the substrate. The adhesion layer may be made of an existing adhesive material for causing the structure to adhere to the substrate.

At step S230, a metal reflective layer is formed on the adhesion layer. In an embodiment, the metal reflective layer may be formed on the adhesion layer by a silver plating process. Alternatively, the metal reflective layer may be formed directly on the substrate, and the disclosure is not limited thereto.

At step S240, an electrostatic adsorption prevention layer is formed by depositing or spraying a polyester material on the metal reflective layer.

At step S250, a protective layer is formed on the electrostatic adsorption prevention layer.

At step S260, the protective layer is stripped off from the electrostatic adsorption prevention layer so that the electrostatic adsorption prevention layer carries negative electrostatic charges.

At step S270, the light guide plate is placed on the electrostatic adsorption prevention layer of the reflector plate from which the protective layer is stripped off.

At step S280, the optical component is placed on the side of the light guide plate distal to the electrostatic adsorption prevention layer.

In some embodiments, the depositing or spraying a polyester material on the metal reflective layer to form the electrostatic adsorption prevention layer includes depositing or spraying a polycarbonate material on the metal reflective layer to form the electrostatic adsorption prevention layer; and the forming the protective layer on the electrostatic adsorption prevention layer includes depositing or spraying a polyethylene material, a poly urethane material, or an acrylic material on the electrostatic adsorption prevention layer to form the protective Layer.

It should be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A backlight module comprising a reflector plate and an optical component,
    wherein the reflector plate comprises a metal reflective layer and an electrostatic adsorption prevention layer disposed on a side of the metal reflective layer, wherein the electrostatic adsorption prevention layer is made of a polyester material and carries negative electrostatic charges;
    wherein the optical component is disposed on a side, distal to the metal reflective layer, of the electrostatic adsorption prevention layer of the reflector plate; and
    wherein the optical component comprises a light guide plate and an optical layer, the light guide plate is disposed on the electrostatic adsorption prevention layer, and the optical layer is disposed on a side of the light guide plate distal to the electrostatic adsorption prevention layer, and the light guide plate is in contact with the electrostatic adsorption prevention layer.

2. The backlight module of claim 1, wherein the light guide plate is made of a polyester material.

3. The backlight module of claim 2, wherein the electrostatic adsorption prevention layer and the light guide plate are both made of a polycarbonate material.

4. The backlight module of claim 3, wherein the electrostatic adsorption prevention layer has a thickness ranging from 75 μm to 150 μm.

5. The backlight module of claim 4, wherein the electrostatic adsorption prevention layer has a thickness ranging from 75 μm to 125 μm.

6. The backlight module of claim 5, wherein the reflector plate comprises a substrate and an adhesion layer, the adhesion layer is disposed on the substrate, and the metal reflective layer is disposed on a side of the adhesion layer distal to the substrate.

7. The backlight module of claim 6, wherein the metal reflective layer is made of silver.

8. A display device comprising a display panel, and the backlight module of claim 1.

9. The display device of claim 8, wherein the light guide plate is made of a polyester material.

10. The display device of claim 9, wherein the electrostatic adsorption prevention layer and the light guide plate are both made of a polycarbonate material.

11. A manufacturing method for a backlight module, the backlight module comprising a reflector plate and an optical component, the optical component comprising a light guide plate and an optical layer, and the light guide plate being disposed on the reflector plate, wherein the manufacturing method for the backlight module comprises:
    forming an adhesion layer on a substrate;
    forming a metal reflective layer on the adhesion layer;
    depositing or spraying a polyester material on the metal reflective layer to form an electrostatic adsorption prevention layer;
    forming a protective layer on the electrostatic adsorption prevention layer;
    stripping off the protective layer from the electrostatic adsorption prevention layer such that the electrostatic adsorption prevention layer carries negative electrostatic charges;
    placing the light guide plate on the electrostatic adsorption prevention layer of the reflector plate from which the protective layer is stripped off; and
    placing the optical layer on a side of the light guide plate distal to the electrostatic adsorption prevention layer.

12. The manufacturing method of claim 11, wherein
    the depositing or spraying a polyester material on the metal reflective layer to form the electrostatic adsorption prevention layer comprises: depositing or spraying a polycarbonate material on the metal reflective layer to form the electrostatic adsorption prevention layer;
    the forming a protective layer on the electrostatic adsorption prevention layer comprises: depositing or spraying a polyethylene material on the electrostatic adsorption prevention layer to form the protective layer.

13. The manufacturing method of claim 11, wherein
    the depositing or spraying a polyester material on the metal reflective layer to form the electrostatic adsorption prevention layer comprises: depositing or spraying a polycarbonate material on the metal reflective layer to form the electrostatic adsorption prevention layer;
    the forming a protective layer on the electrostatic adsorption prevention layer comprises: depositing or spraying a polyurethane material on the electrostatic adsorption prevention layer to form the protective layer.

14. The manufacturing method of claim 11, wherein
    the depositing or spraying a polyester material on the metal reflective layer to form the electrostatic adsorption prevention layer comprises: depositing or spraying a polycarbonate material on the metal reflective layer to form the electrostatic adsorption prevention layer;
    the forming a protective layer on the electrostatic adsorption prevention layer comprises: depositing or spraying an acrylic material on the electrostatic adsorption prevention layer to form the protective layer.

* * * * *